US012690577B2

(12) United States Patent
Okuma

(10) Patent No.: US 12,690,577 B2
(45) Date of Patent: Jul. 28, 2026

(54) FISHING REEL

(71) Applicant: GLOBERIDE, INC., Tokyo (JP)

(72) Inventor: Kentaro Okuma, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 69 days.

(21) Appl. No.: 18/385,931

(22) Filed: Nov. 1, 2023

(65) Prior Publication Data

US 2024/0237627 A1    Jul. 18, 2024

(30) Foreign Application Priority Data

Jan. 13, 2023    (JP) ................................. 2023-003643

(51) Int. Cl.
*A01K 89/01*          (2006.01)
(52) U.S. Cl.
CPC .. *A01K 89/011223* (2015.05); *A01K 89/0113* (2015.05)
(58) Field of Classification Search
CPC ............................................. A01K 89/011223
USPC ......................................................... 242/321
See application file for complete search history.

(56) References Cited

U.S. PATENT DOCUMENTS 4,332,358 A    6/1982 Neufeld
5,362,012 A    11/1994 Ban

FOREIGN PATENT DOCUMENTS

CH            269997 A    8/1950
JP        2001-251996 A    9/2001
JP        2006-197892 A    8/2006

OTHER PUBLICATIONS

Sep. 4, 2024 Office Action issued in Taiwanese Patent Application No. 112142326.
Oct. 30, 2024 Office Action issued in Australian Patent Application No. 2023282189.
Apr. 26, 2024 Extended Search Report issued in European Patent Application No. 23209393.0.
Nov. 27, 2025 Office Action issued in Japanese Application No. 2023-003643.
Oct. 25, 2025 Office Action issued in Chinese Application No. 202311452151.6.
Apr. 1, 2026 Office Action issued in Chinese Application No. 202311452151.6.
Mar. 28, 2026 Office Action issued in Singaporean Patent Application No. 10202303180X.

*Primary Examiner* — Anna M Momper
*Assistant Examiner* — Tiffany Domonique Jefferson
(74) *Attorney, Agent, or Firm* — Oliff PLC

(57) ABSTRACT

A fishing reel of the present invention comprises: a pinion gear that is rotatably driven by a rotating operation of a handle; and a bearing that rotatably supports the pinion gear with respect to a reel main body. The bearing comprises a first engagement portion and a second engagement portion, an axial movement of the bearing is restricted by fitting the first engagement portion into a movement restricting portion provided in the reel main body, and a rotational movement of the bearing is restricted by fitting the second engagement portion into a rotation restricting portion provided in the reel main body.

5 Claims, 9 Drawing Sheets

FISHING REEL

CROSS-REFERENCE TO RELATED APPLICATION

This application claims priority under 35 U.S.C. § 119 to Japanese Patent Application No. 2023-003643 filed on Jan. 13, 2023 in the Japanese Patent Office, the entire contents of each hereby incorporated by reference.

BACKGROUND OF THE INVENTION

1. Technical Field

The present invention relates to a fishing reel comprising a bearing that supports a drive member.

2. Description of the Related Art

A spinning reel which is a fishing reel includes a pinion gear (drive member) which is rotatably driven by a rotating operation of a handle connected to a drive force transmitting mechanism in a reel main body, and a spool shaft that holds a spool around which a fishing line is wound is inserted into the pinion gear. In addition, a rotor having a fishing line guiding unit is locked and fixed to the pinion gear in an integrally rotatable manner, and the spool shaft is configured to be rotatably driven in a front-rear direction via an oscillating mechanism.

The pinion gear is rotatably supported by front and rear bearings provided in a reel main body, and regarding the rear bearing, as disclosed in JP 2006-197892 A, a configuration in which a pinion gear and a spool shaft are supported by a collar type bearing is known. The collar type bearing disclosed in JP 2006-197892 A is configured to have a cylindrical shape in which a small diameter portion and a large diameter portion are integrally formed adjacent to each other in an axial direction, the spool shaft is supported by the small diameter portion, and the pinion gear is supported by the large diameter portion. In addition, the bearing configured to have the cylindrical shape is provided in a reel main body and is mounted on a cup-shaped support having a through-hole formed at the center thereof.

SUMMARY OF THE INVENTION

The known bearing (collar) described above receives a moving action in a rotation direction due to rotation of the pinion gear and receives a moving action in an axial direction due to frontward and rearward movement of the spool shaft. In addition, when the collar receives the moving action in the axial direction, the small diameter portion abuts on an end surface of the pinion gear, and the large diameter portion abuts on the cup-shaped support of the reel main body.

As described above, movement of the bearing in accordance with a rotating operation of the handle results in a poor rotation feeling. In particular, in order to effectively restrict the movement of the collar in the axial direction, problems such as an increase in space, an increase in assembling processes due to adhesion or the like, and deterioration in assemblability occur. In addition, it is difficult to miniaturize the reel main body, and the costs increase.

The present invention has been made in view of the above-described problems, and an object of the present invention is to provide a fishing reel having a bearing structure capable of improving a feeling when a drive member rotates and reducing manufacturing costs without increasing a size of a reel main body.

In order to achieve the above-described object, a fishing reel according to the present invention is configured to comprise: a drive member that is rotatably driven by a rotating operation of a handle provided in a reel main body; and a bearing that rotatably supports the drive member with respect to the reel main body. The bearing comprises a first engagement portion and a second engagement portion. Axial movement of the bearing is restricted by fitting the first engagement portion into a movement restricting portion provided in the reel main body, and rotational movement of the bearing is restricted by fitting the second engagement portion into a rotation restricting portion provided in the reel main body.

In the fishing reel having the configuration described above, the bearing supporting the drive member comprises the first engagement portion and the second engagement portion. Since the engagement portions are fitted into the movement restricting portion and the rotation restricting portion provided in the reel main body, respectively, axial and rotational movements of the bearing are restricted Therefore, since the bearing does not move when the drive member rotates, a good rotational feeling can be obtained, and since it is not necessary to fix the bearing to the reel main body by adhesion or the like, a configuration for an assembly procedure or fixing of the bearing is simplified, and there is no increase in costs.

According to the present invention, it is possible to obtain a fishing reel having a bearing structure capable of improving a feeling when a drive member rotates and reducing manufacturing costs without increasing a size of a reel main body.

BRIEF DESCRIPTION OF THE DRAWINGS

FIGS. 4A and 4B are respective views for describing a method of assembling and fixing a bearing;

DETAILED DESCRIPTION

Hereinafter, an embodiment of a fishing reel according to the present invention will be described in detail with reference to the accompanying drawings.

Figure 1:
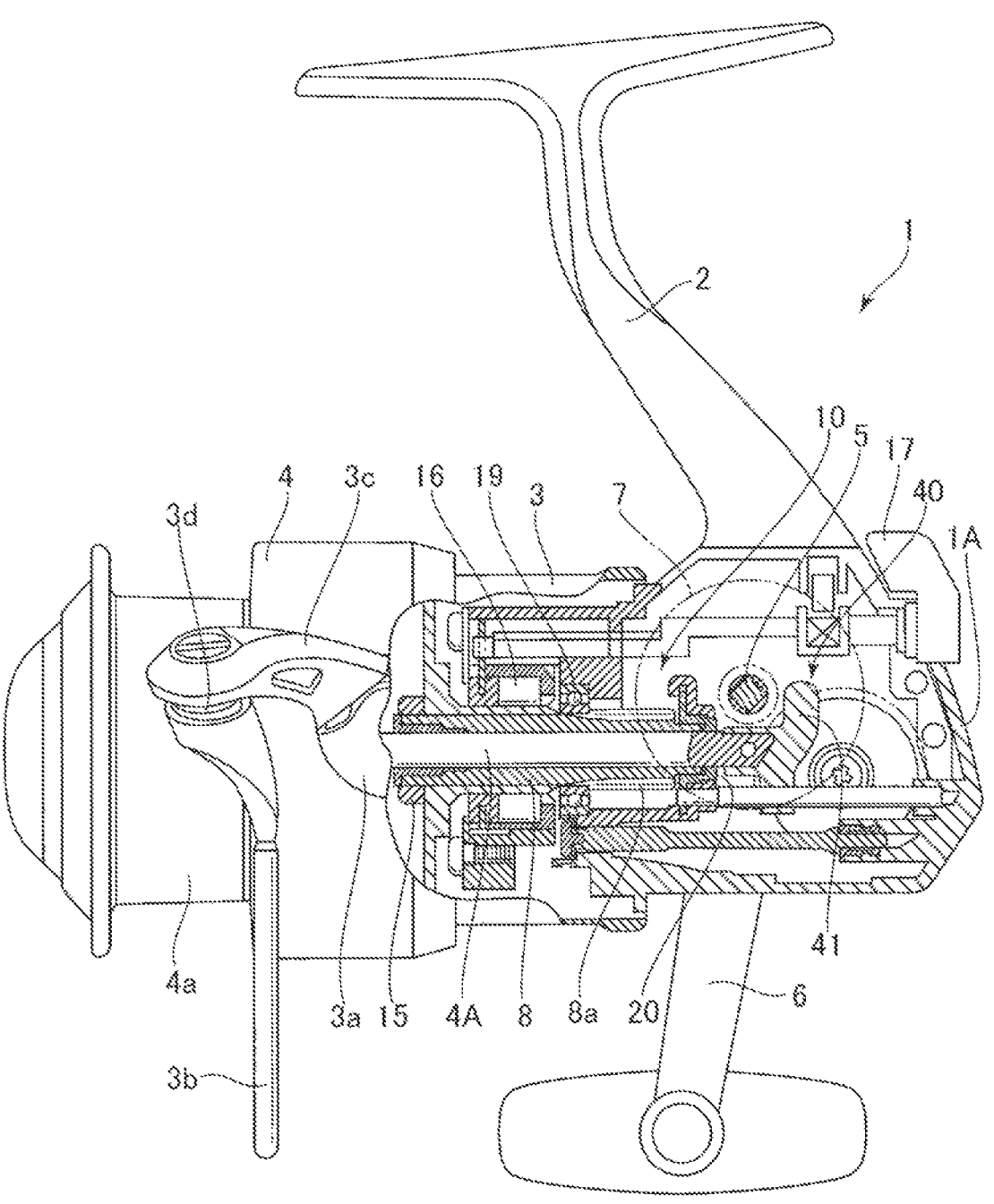
FIG. 1 is a side view illustrating an example of a fishing reel (spinning reel) according to the present invention and is a view illustrating an internal structure.
Figure 2:
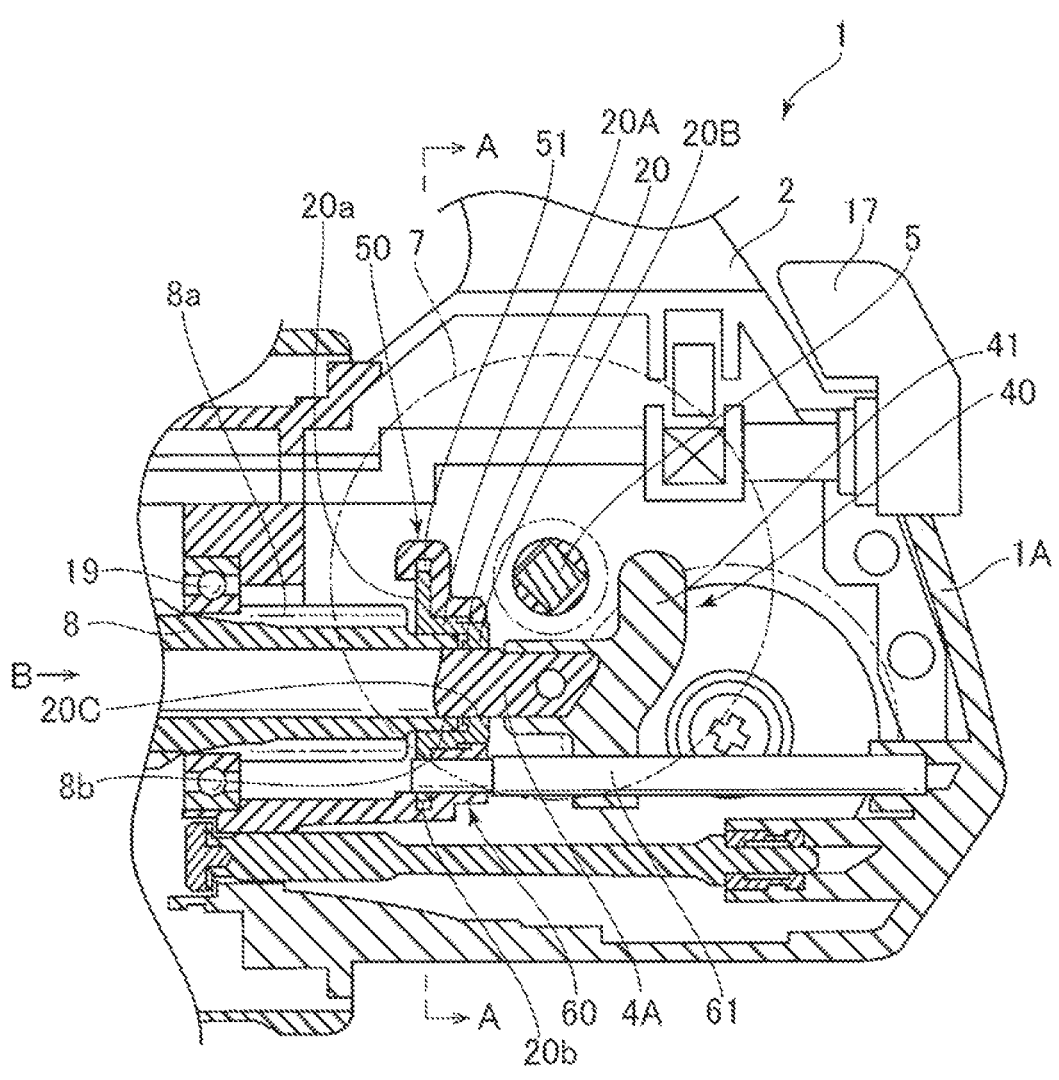
FIG. 2 is an enlarged view of a main part of FIG. 1.

FIGS. 1 and 2 are views illustrating a first embodiment of the fishing reel (spinning reel) according to the present invention, in which FIG. 1 is a side view illustrating an internal structure, and FIG. 2 is an enlarged view of a main part of FIG. 1.

A reel main body 1A of a spinning reel (hereinafter referred to as a reel) 1 according to the embodiment is integrally formed with a reel leg 2 attached to a fishing rod, and a rotatably supported rotor 3 and a spool 4 supported to be movable frontward and rearward in synchronization with a rotational motion of the rotor 3 are disposed in front of the reel leg 2.

The rotor 3 comprises a pair (only one is illustrated in FIG. 1) of arm portions 3*a* that rotate around the spool 4, and a bail support member 3*c* to which a base end portion of a bail 3*b* is attached is rotatably supported at a front end portion of each arm portion 3*a* between a fishing line winding position and a fishing line releasing position. Note that one base end portion of the bail 3*b* is attached to a fishing line guiding portion 3*d* provided integrally with the bail support member 3*c*.

In the reel main body 1A, a handle shaft 5 is rotatably supported, and a handle 6 is attached to a protrusion end portion of the handle shaft. In addition, a known drive force transmitting mechanism 10 is connected to the handle shaft 5, and the drive force transmitting mechanism 10 comprises a drive gear 7 mounted to be integrally rotatable with the handle shaft 5 and a pinion gear (drive member) 8 having a tooth portion 8*a* meshed with the drive gear 7. The pinion gear 8 extends in a direction orthogonal to the handle shaft 5 and has a cavity portion that is formed inside and extends in an axial direction.

The pinion gear 8 configured as the drive member is rotatably supported in the reel main body 1A by a pair of bearings 19 and 20 provided in the reel main body 1A at a front side and a rear side of the tooth portion 8*a*, respectively. In addition, the pinion gear 8 extends toward the spool 4, the rotor 3 is locked and fitted to a front end portion of the pinion gear 8 via a fastening nut 15, and the rotor 3 is integrally rotatable with the pinion gear 8.

A known one-way clutch 16 constituting a backstop mechanism is disposed on the pinion gear 8 on a front side of the bearing 19. As is known, the one-way clutch 16 comprises an inner ring locked and fitted to an outer surface of the pinion gear 8, an outer ring provided outside the inner ring in a radial direction, a rolling member held between the inner ring and the outer ring, and a holder holding the rolling member. The holder is driven and switched by rotating a switching operation lever 17 provided outside the reel main body 1A, and the one-way clutch 16 switches between an inverse rotation preventing state in which rotation of the handle 6 (rotor 3) in a fishing line feeding direction is prevented and a freely rotatable state.

A spool shaft 4A which extends in a direction orthogonal to the handle shaft 5 and on which the spool 4 is mounted on a tip side of the spool shaft is inserted into the cavity portion formed inside the pinion gear 8 to be movable in the axial direction. A known oscillating mechanism 40 for causing the spool 4 (spool shaft 4A) to reciprocate frontward and rearward in accordance with a rotating operation of the handle 6 is engaged with a rear end of the spool shaft 4A.

In the reel having the above-described configuration, when a winding operation is performed by the handle 6, the rotor 3 is rotatably driven via the drive force transmitting mechanism 10, and the spool 4 (spool shaft 4A) is caused to reciprocate frontward and rearward via the oscillating mechanism 40, so that the fishing line is evenly wound around a winding body 4*a* of the spool 4 via the fishing line guiding portion 3*d*.

Next, with reference to FIGS. 2 to 4B, a configuration of the rear bearing 20 that rotatably supports the pinion gear 8 with respect to the reel main body 1A will be described.

The bearing 20 is configured as a collar type fixed to the reel main body 1A, has a function of rotatably supporting a cylindrical portion 8*b* on a rear side of the tooth portion 8*a* of the pinion gear 8, and has a function of stably moving the spool shaft 4A frontward and rearward by coming into contact with an outer surface of the spool shaft 4A that projects rearward from the cylindrical portion 8*b* and moves frontward and rearward.

In addition, the bearing 20 comprises a large diameter portion 20A that comes into contact with an outer circumferential surface of (the cylindrical portion 8*b*) of the pinion gear 8 and a small diameter portion 20B that comes into contact with an outer circumferential surface of the spool shaft 4A, and the bearing is configured as a cylindrical body in which the large and small diameter portions are adjacent in the axial direction and integrated with each other. A through-hole 20C is formed at a shaft core portion of a center of the small diameter portion 20B, and the spool shaft 4A is inserted through the through-hole.

As will be described below, even when the pinion gear 8 is rotatably driven, the bearing 20 is fixed to the reel main body 1A in a state where the rotational movement is restricted, and even when the spool shaft 4A moves frontward and rearward, the bearing is fixed to the reel main body 1A in a state where the movement in a front-rear direction is restricted.

The bearing 20 of the embodiment comprises a first engagement portion 20*a* and a second engagement portion 20*b* to be fixed to the reel main body in the above-described states. Specifically, the first engagement portion 20*a* is configured as a projecting piece projecting radially outward at a part of the large diameter portion 20A (hereinafter also referred to as a projecting piece 20*a*), and the second engagement portion 20*b* is configured as a recess (substantially U-shaped recess projecting from an outer circumferential edge of the bearing) projecting radially outward at a part of the large diameter portion 20A (hereinafter also referred to as a recess 20*b*).

In this case, as illustrated in FIGS. 3A to 4B, the projecting piece 20*a* and the recess 20*b* are preferably formed at positions radially opposite to each other with respect to a center axis X of the bearing 20 (the projecting piece 20*a* and the recess 20*b* are formed at intervals of approximately 180°). That is, as described above, since the bearing 20 formed in a cylindrical shape has the function of restricting the axial movement and the function of restricting the rotation, it is possible to stably exhibit the functions by arranging positions, where the functions are exhibited, in a symmetrical direction with respect to the center axis X of the bearing 20.

The projecting piece 20*a* is fitted in a movement restricting portion 50 provided in the reel main body 1A to restrict the axial movement of the bearing 20, and the recess 20*b* is fitted in a rotation restricting portion 60 provided in the reel main body 1A to restrict the rotational movement of the bearing 20. In this case, the recess constituting the rotation restricting portion may be configured of a through-hole. However, a substantially U-shaped recess allows a shaft member constituting the following rotation restricting portion to be easily disposed.

The movement restricting portion 50 of the embodiment is configured of a groove 51 extending in a right-left direction (direction orthogonal to the paper surface in FIGS. 1 and 2) of the reel main body 1A so that a side plate of the reel main body 1A can be opened to pinch the bearing 20 such that the projecting piece 20*a* can be inserted and fitted. That is, when the projecting piece 20*a* is fitted into the groove 51, the projecting piece is fixed in a clamped state, and thereby the axial movement of the bearing 20 is restricted (see FIGS. 2 to 3B).

In addition, the rotation restricting portion 60 of the embodiment is configured of a shaft member 61 disposed along the reel main body 1A in the front-rear direction. The shaft member 61 is a configurational element of the above-described known oscillating mechanism 40 and is a member that performs a function of guiding a slider 41 when the slider 41 fixed to the rear end of the spool shaft 4A slides in the front-rear direction by a cam action when the handle 6 is rotated. In the embodiment, the shaft member 61 having a function of guiding the slider 41 of the oscillating mechanism 40 also serves as the rotation restricting portion, and the rotational movement of the bearing 20 is restricted by fitting and fixing the columnar shaft member 61 in the recess 20b (See FIGS. 2 to 3B).

Figure 3A:
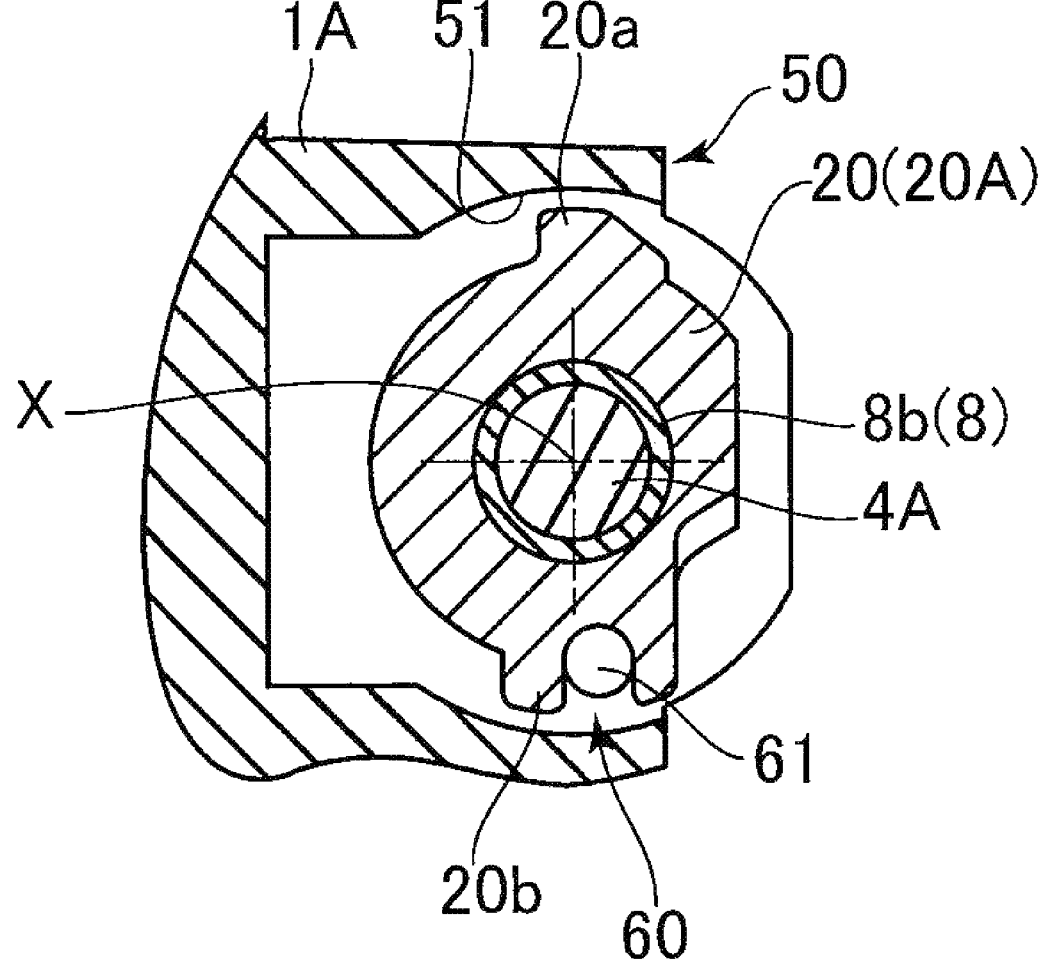
FIG. 3A is a cross-sectional view along line A-A of FIG. 2.
Figure 3B:
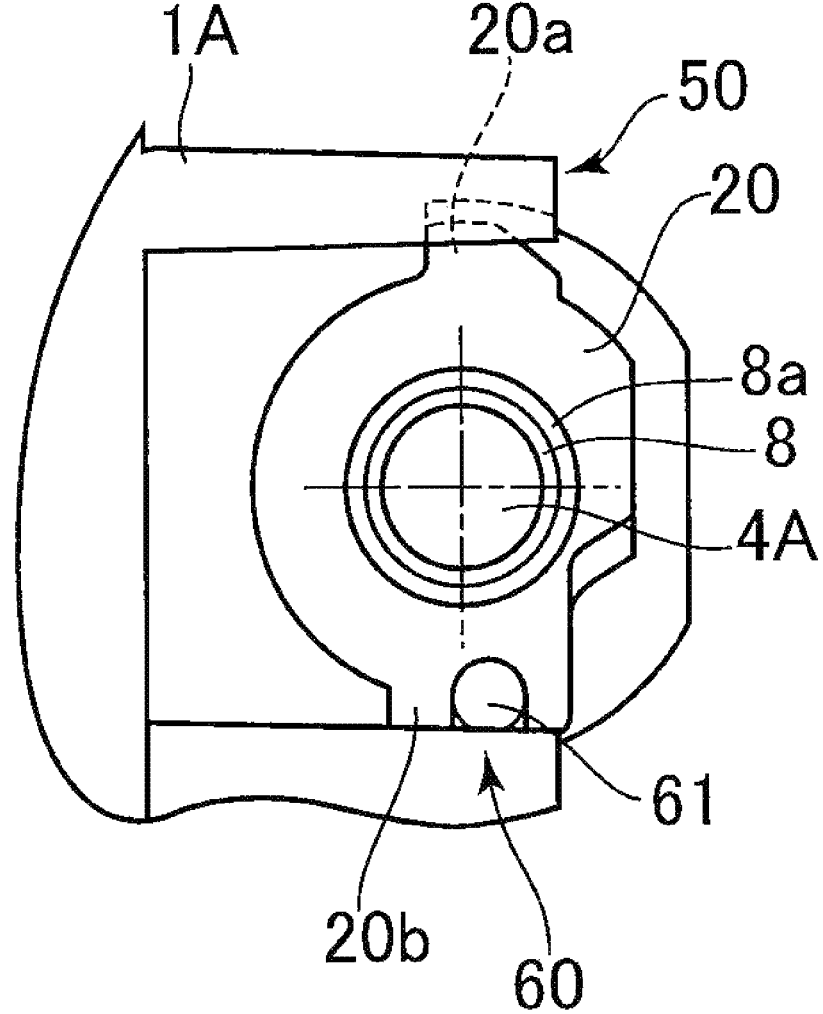
FIG. 3B is a view of FIG. 2 as viewed from a B direction.
Figure 4A:
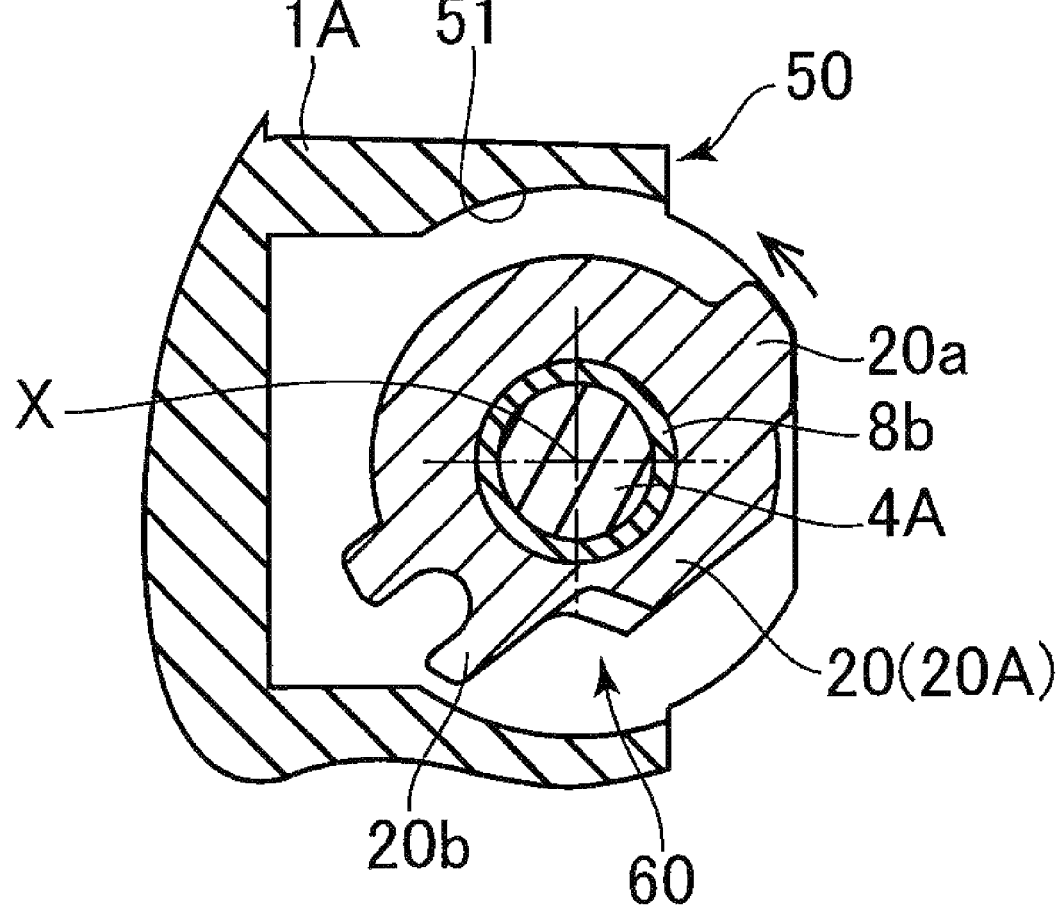
FIG. 4A is a cross-sectional view along line A-A of FIG. 2.
Figure 4B:
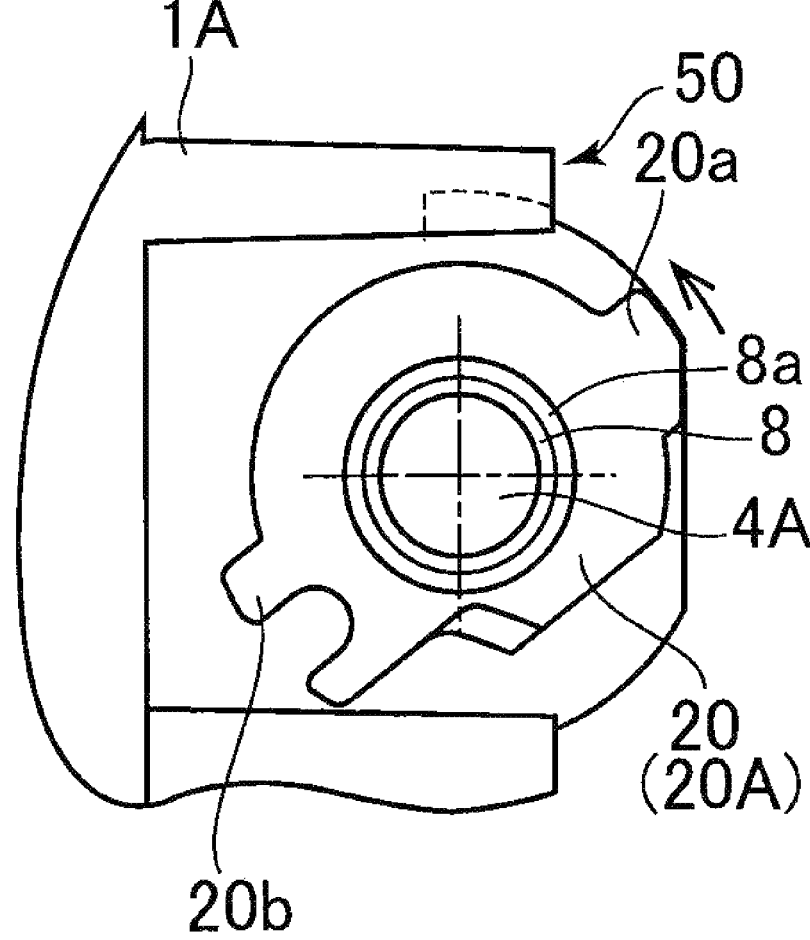
FIG. 4B is a view of FIG. 2 as viewed from the B direction.

In a case of installing the bearing 20 having the above-described configuration, as illustrated in FIGS. 4A and 4B, the projecting piece 20a is aligned with the groove 51 in a state of being slightly rotated in a clockwise direction with respect to the center axis X and is rotated in an arrow direction to be inserted and fitted into the groove 51 which is the movement restricting portion (see FIGS. 3A and 3B). In this state, the recess 20b of the bearing 20 is rotated to be positioned below and symmetrically with the projecting piece 20a, and the bearing 20 can be installed by fitting the shaft member 61 which is the rotation restricting portion in the recess.

When the bearing 20 is installed as described above, the projecting piece 20a is fitted in the groove 51 and clamped by the movement restricting portion 50, and the spool shaft 4A does not move in the axial direction even if the spool shaft 4A reciprocates frontward and rearward by the oscillating mechanism Therefore, the bearing 20 does not abut on an end surface of the pinion gear 8. In addition, since the shaft member 61 is fitted in the recess 20b, the rotational movement of the bearing 20 is also restricted.

As a result, even when the pinion gear 8 is rotatably driven with the rotation of the handle 6 and the spool shaft 4A is reciprocally driven, rattling or sound is not generated, and thus a rotational feeling can be improved.

In the above-described configuration, the movement restricting portion 50 may have only the groove 51 formed in the reel main body, and the rotation restricting portion 60 uses the configurational member (shaft member 61) of the oscillating mechanism 40. Therefore, there is no need to provide an additional part, and the bearing 20 can be fixed at low costs without increasing a size of the reel main body. In addition, since adhesion is not required to restrict the axial and rotational movements of the bearing 20, the bearing 20 can be fixed at low costs. Further, since the member that restricts the axial and rotational movements of the bearing 20 does not need to be press-fitted, the bearing 20 can be fixed while maintaining dimensional accuracy of components.

A constituent material of the bearing 20 described above can be a material having good slidability and excellent wear resistance, for example, a resin material such as polyacetal (POM) or polyphenylene sulfide (PPS), a ceramic material such as carbon, or a metal material such as aluminum (aluminum alloy).

Figure 5A:
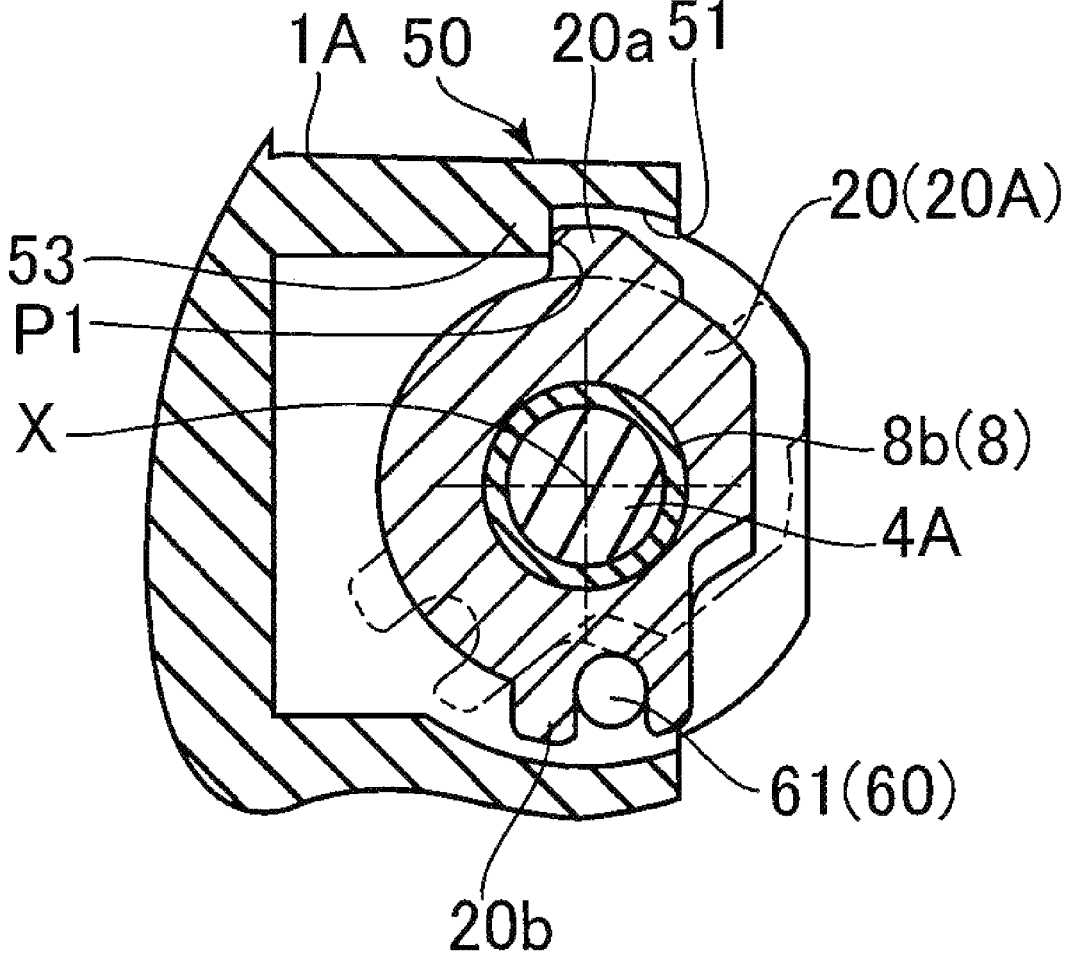
FIGS. 5A and 5B are views illustrating a second embodiment of the present invention.
Figure 5B:
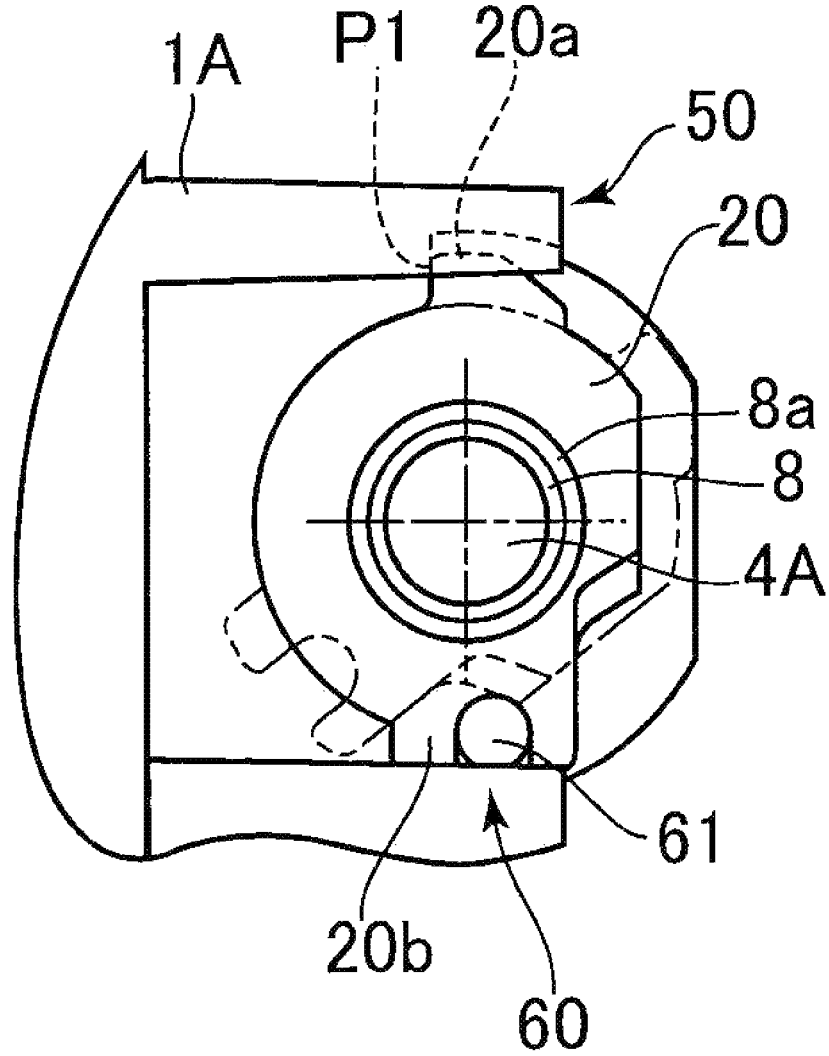

FIGS. 5A and 5B are views corresponding to FIGS. 3A and 3B and FIGS. 4A and 4B, respectively, and are views illustrating a second embodiment.

In this embodiment, when the bearing 20 is fixed to the movement restricting portion 50 and the rotation restricting portion 60, a fixing portion for locating a position where the bearing 20 is fixed to the movement restricting portion 50 and the rotation restricting portion 60 is provided.

For example, as illustrated in FIGS. 5A and 5B, a fixing portion 53 can be formed to serve as a stopper in the groove 51 of the movement restricting portion 50 and has a configuration in which when the projecting piece 20a of the bearing 20 is fitted into the groove 51 and rotated in the arrow direction in FIGS. 4A and 4B, the projecting piece 20a abuts on the groove and cannot rotate from a position P1. As described above, since the position of the bearing 20 can be fixed at the position P1, the recess 20b of the bearing 20 can be always located at the same position. Therefore, when the bearing 20 is assembled, the shaft member 61 can be easily fitted into the recess 20b, and the assemblability can be improved.

Figure 6:
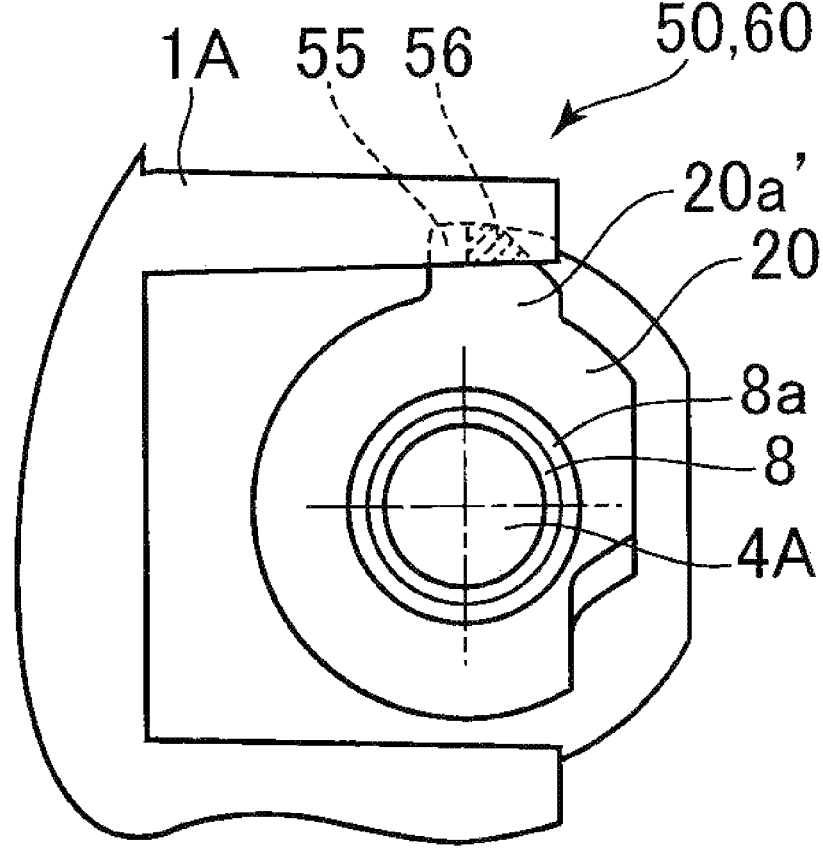
FIG. 6 is a view illustrating a third embodiment of the present invention.

FIG. 6 is a view illustrating a third embodiment.

In this embodiment, the movement restricting portion 50 and the rotation restricting portion 60 are configured to have engagement structures provided on the bearing 20 and the reel main body 1A, respectively, and have a configuration in which the axial and rotational movements of the bearing 20 can be restricted when the bearing 20 is mounted at a predetermined position of the reel main body 1A.

In an engagement structure illustrated in FIG. 6, an elastically deformable locking claw (locking portion) 55 is formed on a side surface of a projecting piece 20a' of the bearing 20, and a fastener (such as a locking claw having an engagement recess) 56 that is engaged with the locking claw 55 is formed at a position of a joint surface of the reel main body 1A opposite to the locking claw, the position corresponding to the locking claw 55, and thereby the movement restricting portion 50 and the rotation restricting portion 60 are formed. That is, the locking claw 55 has a function as the first engagement portion that restricts the axial movement and a function as the second engagement portion that restricts the rotational movement. The locking claw 55 formed at the projecting piece 20a' is engaged with the fastener 56 formed in the reel main body 1 by pinching the bearing 20 to restrict the axial movement and the rotational movement of the bearing 20.

In this case, the locking structure of the locking claw 55 and the fastener 56 is not particularly limited as long as the axial movement and the rotational movement of the bearing 20 can be restricted when both components are engaged with each other, such as a protrusion-recess engagement or an engagement between a protrusion and a through-hole.

In this manner, by assembling the bearing 20 at a predetermined position of the reel main body 1A, the axial and rotational movements of the bearing 20 can be restricted, so that there is no need to form the groove 51 in the reel main body 1A or to dispose the shaft member 61 as in the above-described embodiment, and the manufacturing costs can be further reduced.

Note that the above-described locking claw 55 can be provided at various positions such as a side surface or a circumferential edge of the bearing 20, and the number of locking claws can be appropriately modified, such as being provided at a position radially opposite to the locking claw 55.

The embodiment according to the present invention has been described above, but the present invention is not limited to the embodiment and may be modified in various ways.

The present invention is characterized by a structure of a bearing that rotatably supports one end portion of a pinion gear which is a drive member, and the other configurations are not limited. In addition, the present invention can also be applied to bearings of various drive members other than the pinion gear.

In addition, in the first embodiment described above, the first engagement portion that restricts the axial movement of the bearing is configured of the projecting piece 20*a* formed on the bearing 20, and the movement restricting portion 50 is configured of the groove 51 provided in the reel main body 1A. However, a configuration may be employed in which a groove is formed in the circumferential edge of the bearing 20, and a projecting piece is formed on the reel main body side such that both the groove and the projecting piece are fitted. Further, the positions where the first engagement portion and the second engagement portion are provided, the number of engagement portions, and the fitting structure of each engagement portion are not limited to those in the above-described embodiment and can be appropriately modified.

REFERENCE SIGNS LIST

1 Fishing reel (spinning reel)
1A Reel main body
3 Rotor
4 Spool
4A Spool shaft
6 Handle
8 Pinion gear
10 Drive force transmitting mechanism
20 Bearing
20*a* Projecting piece (first engagement portion)
20*b* Recess (second engagement portion)
50 Movement restricting portion
51 Groove
60 Rotation restricting portion
61 Shaft member

What is claimed is:

1. A fishing reel comprising:

a drive member that is rotatably driven by a rotating operation of a handle provided in a reel main body; and a bearing that rotatably supports the drive member with respect to the reel main body, wherein the bearing comprises a first engagement portion and a second engagement portion, and an axial movement of the bearing is restricted by fitting the first engagement portion into a movement restricting portion in the reel main body, and a rotational movement of the bearing is restricted by fitting the second engagement portion into a rotation restricting portion in the reel main body, the first engagement portion is on an outer side of the bearing in a radial direction, the second engagement portion is at a position radially opposite to the first engagement portion, the movement restricting portion comprises a groove in the reel main body and into which the first engagement portion is fitted, and the rotation restricting portion comprises a shaft member in the reel main body inserted through the second engagement portion.

2. The fishing reel according to claim 1, wherein the drive member is a pinion gear on a spinning reel, and the bearing is a collar member that supports the pinion gear on a rear end side.

3. The fishing reel according to claim 1, wherein the first engagement portion is a projecting piece projecting radially outward, and the second engagement portion is a recess through which the shaft member is inserted.

4. The fishing reel according to claim 1, wherein the movement restricting portion into which the first engagement portion is fitted has a fixing portion to locate a fixing position of the first engagement portion.

5. The fishing reel according to claim 1, wherein the movement restricting portion and the rotation restricting portion have engagement structures respectively on the bearing and the reel main body, and restrict the axial movement and the rotational movement of the bearing by causing both of the engagement structures to be engaged.

* * * * *